United States Patent
Osogami

(10) Patent No.: US 11,790,032 B2
(45) Date of Patent: Oct. 17, 2023

(54) GENERATING STRATEGY BASED ON RISK MEASURES

(71) Applicant: International Business Machines Corporation, Armonk, NY (US)

(72) Inventor: Takayuki Osogami, Yamato (JP)

(73) Assignee: International Business Machines Corporation, Armonk, NY (US)

(*) Notice: Subject to any disclaimer, the term of this patent is extended or adjusted under 35 U.S.C. 154(b) by 424 days.

(21) Appl. No.: 16/882,781

(22) Filed: May 26, 2020

(65) Prior Publication Data

US 2021/0374574 A1 Dec. 2, 2021

(51) Int. Cl.
*G06F 17/11* (2006.01)
*G06F 17/18* (2006.01)

(52) U.S. Cl.
CPC .............. *G06F 17/11* (2013.01); *G06F 17/18* (2013.01)

(58) Field of Classification Search
CPC .......... G06F 17/11; G06F 17/18; G06N 20/00
USPC ............................................................ 703/2
See application file for complete search history.

(56) References Cited

U.S. PATENT DOCUMENTS

| | | | | |
|---|---|---|---|---|
| 8,057,235 B2 * | 11/2011 | Kuznar | ............ | G06N 3/004 705/37 |
| 8,364,511 B2 * | 1/2013 | Tambe | ............ | G06N 7/005 703/2 |
| 8,874,477 B2 | 10/2014 | Hoffberg | | |
| 9,737,988 B2 * | 8/2017 | Pham | ............ | G06T 7/248 |
| 10,091,276 B2 | 10/2018 | Bloomquist et al. | | |
| 10,789,810 B1 * | 9/2020 | Li | ............ | G07F 17/3241 |
| 11,340,079 B1 * | 5/2022 | Ebrahimi Afrouzi | .. | G06V 20/56 |
| 2002/0016759 A1 | 2/2002 | MacReady et al. | | |
| 2006/0225928 A1 * | 10/2006 | Nelson | ............ | B62D 55/07 180/9.44 |
| 2010/0317420 A1 * | 12/2010 | Hoffberg | ............ | G06Q 30/0282 463/1 |
| 2017/0147722 A1 * | 5/2017 | Greenwood | ............ | G06N 3/126 |

(Continued)

FOREIGN PATENT DOCUMENTS

| | | | | |
|---|---|---|---|---|
| CN | 109625220 | * | 4/2019 | ............ H02G 1/10 |
| CN | 112068440 | * | 12/2022 | ............ G05B 13/042 |
| GE | 2271047 | * | 6/2009 | ............ H04L 29/06 |

OTHER PUBLICATIONS

Types of robots—All on Robots, downloaded Apr. 23, 2023, available online at https://www.allonrobots.com/types-of-robots/, 4 pages.*

(Continued)

*Primary Examiner* — Juan C Ochoa
(74) *Attorney, Agent, or Firm* — Edward J. Wixted, III

(57) ABSTRACT

In an approach, a processor obtains a target base strategy for selecting actions of a target agent. A processor obtains an adversarial base strategy for selecting adversarial actions of an adversarial agent. A processor calculates, for each candidate action among a plurality of candidate actions of the target agent, a risk measure of the candidate action based on the adversarial base strategy and a payoff to the target agent in a case where the target agent takes the candidate action and the adversarial agent takes an adversarial action based on the adversarial base strategy. A processor generates a target strategy by adjusting the target base strategy based on the risk measure for each candidate action.

18 Claims, 7 Drawing Sheets

(56) References Cited

U.S. PATENT DOCUMENTS

2019/0354100 A1* 11/2019 Lopez Mejia ............ G06N 7/00
2021/0192358 A1* 6/2021 Song ...................... G06N 3/088

OTHER PUBLICATIONS

Types of Robots—ROBOTS: Your Guide to the World of Robotics, downloaded Apr. 23, 2023, available online at https://robots.ieee.org/learn/types-of-robots/, 5 pages.*

Types of Robots: How Robotics Technologies Are Shaping Today's World, downloaded Apr. 23, 2023, Programmable Logic Controller Overview in Industrial Automation, available online at https://www.intel.com/content/www/us/en/robotics/types-and-applications.html, 4 pages.*

Arun, What's the Difference Between Autonomous Robots and Controlled Robots?, Jun. 25, 2021, available online at https://inertialsense.com/difference-between-autonomous-and-controlled-robots/#:~:text=An%20autonomous%20robot%20versus%20a%20controlled%20robot.,telling%20it%20where%20to%20go., 1 page.*

Li et al., "Multi-criteria decision-making method based on dominance degree and BWM with probabilistic hesitant fuzzy Information", International Journal of Machine Learning and Cybemetics, Jun. 19, 2018, 15 pages, <https://link.springer.com/article/10.1007/s13042-018-0845-2>.

Picardo, Elvis, "How Game Theory Strategy Improves Decision Making", Investopedia, Updated May 19, 2019, Printed Mar. 5, 2020, 13 pages, <https://www.investopedia.com/articles/investing/111113/advanced-game-theory-strategies-decisionmaking.asp>.

Bm, "Remarks Accompanying Filing of Application", Filed Herewith, 1 page.

* cited by examiner

Require: Initial state $s_0$; Forward model $F(\cdot)$; Nominal distributions $\mathbf{p}_0$, $\mathbf{q}_0$ (e.g. uniform)
1: $t \leftarrow 0$; $\mathcal{D} \leftarrow \emptyset$; Initialize value network $\tilde{V}(\cdot)$
2: repeat
    /* Choose player 1's action at $s_t$ */
3:   for all $a \in \mathcal{A}$ do
4:     Sample $\{b^{(m)}\}_{m=1}^{M} \sim_{\text{i.i.d.}} \mathbf{q}_0$
5:     for $m = 1, \ldots, M$ do
6:       Simulate $\{s^{(n)}\}_{n=1}^{N} \sim_{\text{i.i.d.}} F(s_t, a, b^{(m)})$
7:       $v^{(m)} \leftarrow \frac{1}{N} \sum_{n=1}^{N} \tilde{V}(s^{(n)})$
8:     end for
9:     $\tilde{Q}(s_t, a) \leftarrow -\frac{1}{\gamma} \ln \frac{1}{M} \sum_{m=1}^{M} e^{-\gamma (r_{s_t, a, b^{(m)}} + \rho v^{(m)})}$
10:  end for
11:  Let $\mathbf{p}^\star(a|s_t) = \frac{\mathbf{p}_0(a|s_t)}{Z} e^{\alpha \tilde{Q}(s_t, a)}$, $\forall a \in \mathcal{A}$
12:  Sample $a_t \sim \mathbf{p}^\star(\cdot | s_t)$
13:  $k_{s_t}^{\mathbf{p}^\star} \leftarrow \text{KL}(\mathbf{p}^\star(\cdot | s_t) \| \mathbf{p}_0(\cdot | s_t))$

*FIG. 5A*

/* Choose player 2's action at $s_t$ */
14: for all $b \in \mathcal{B}$ do
15:     Simulate $\{s^{(n)}\}_{n=1}^{N} \sim_{\text{i.i.d.}} F(s_t, a_t, b)$
16:     $v \leftarrow \frac{1}{N} \sum_{n=1}^{N} \tilde{V}(s^{(n)})$
17:     $\tilde{Q}(s_t, a_t, b) \leftarrow r_{s_t, a_t, b} + \rho v$
18: end for
19: Let $\mathbf{q}^{\star}(b|s_t, a_t) = \frac{\mathbf{q}_0(b|s_t, a_t)}{Z} e^{-\gamma \tilde{Q}(s_t, a_t, b)}, \forall b \in \mathcal{B}$.

20: $b_t \sim \mathbf{q}^{\star}(s_t, a_t)$
21: $\ell^{\mathbf{q}^{\star}}_{s_t, a_t} \leftarrow \text{KL}(\mathbf{q}^{\star}(\cdot|s_t, a_t) \| \mathbf{q}_0(\cdot|s_t, a_t))$
/* Go to next state, store training data, and retrain */
22: $s_{t+1} \sim F(s_t, a_t, b_t)$
23: $y_t \leftarrow r_{s_t, a_t, b_t} - \frac{k^{\mathbf{p}^{\star}}_{s_t}}{\alpha} + \frac{\ell^{\mathbf{q}^{\star}}_{s_t, a_t}}{\gamma} + \rho \tilde{V}(s_{t+1})$
24: Update $\mathcal{D}$ with $(s_t, y_t)$ (e.g., append)
25: if Condition for retraining is met then
26:     Retrain $\tilde{V}$ with $\mathcal{D}$.
27: end if
28: $t \leftarrow t + 1$
29: until Stopping condition is met

*FIG. 5B*

GENERATING STRATEGY BASED ON RISK MEASURES

BACKGROUND

The present invention relates generally to the field of generating a strategy based on risk measures, and more particularly to generating a strategy based on risk measures that can reduce computational workload.

In strategic decision making, each agent (e.g., player) seeks to find a strategy that can maximize the agent's expected payoff. The optimal strategy depends on the strategies of other agents. Theoretically, the Nash equilibrium is a standard solution of determining optimal strategies under the condition that each agent does not know the actions of other agents before taking its action.

SUMMARY

Aspects of an embodiment of the present invention disclose a computer-implemented method, computer program product, and computer system. A processor obtains a target base strategy for selecting actions of a target agent. A processor obtains an adversarial base strategy for selecting adversarial actions of an adversarial agent. A processor calculates, for each candidate action among a plurality of candidate actions of the target agent, a risk measure of the candidate action based on the adversarial base strategy and a payoff to the target agent in a case where the target agent takes the candidate action and the adversarial agent takes an adversarial action based on the adversarial base strategy. A processor generates a target strategy by adjusting the target base strategy based on the risk measure for each candidate action.

BRIEF DESCRIPTION OF THE DRAWINGS

FIG. 5A and FIG. 5B show an algorithm according to an embodiment of the present invention.

DETAILED DESCRIPTION

Embodiments of the present invention recognize that determining an optimal strategy of an agent generally requires massive computational power. This is because an agent needs to find optimal strategies of other agents as well as finding its own optimal strategy, each of which must be optimal in terms of the Nash equilibrium.

Hereinafter, example embodiments of the present invention will be described. The example embodiments shall not limit the invention according to the claims, and the combinations of features described in the embodiments are not necessarily essential to the invention.

Figure 1:
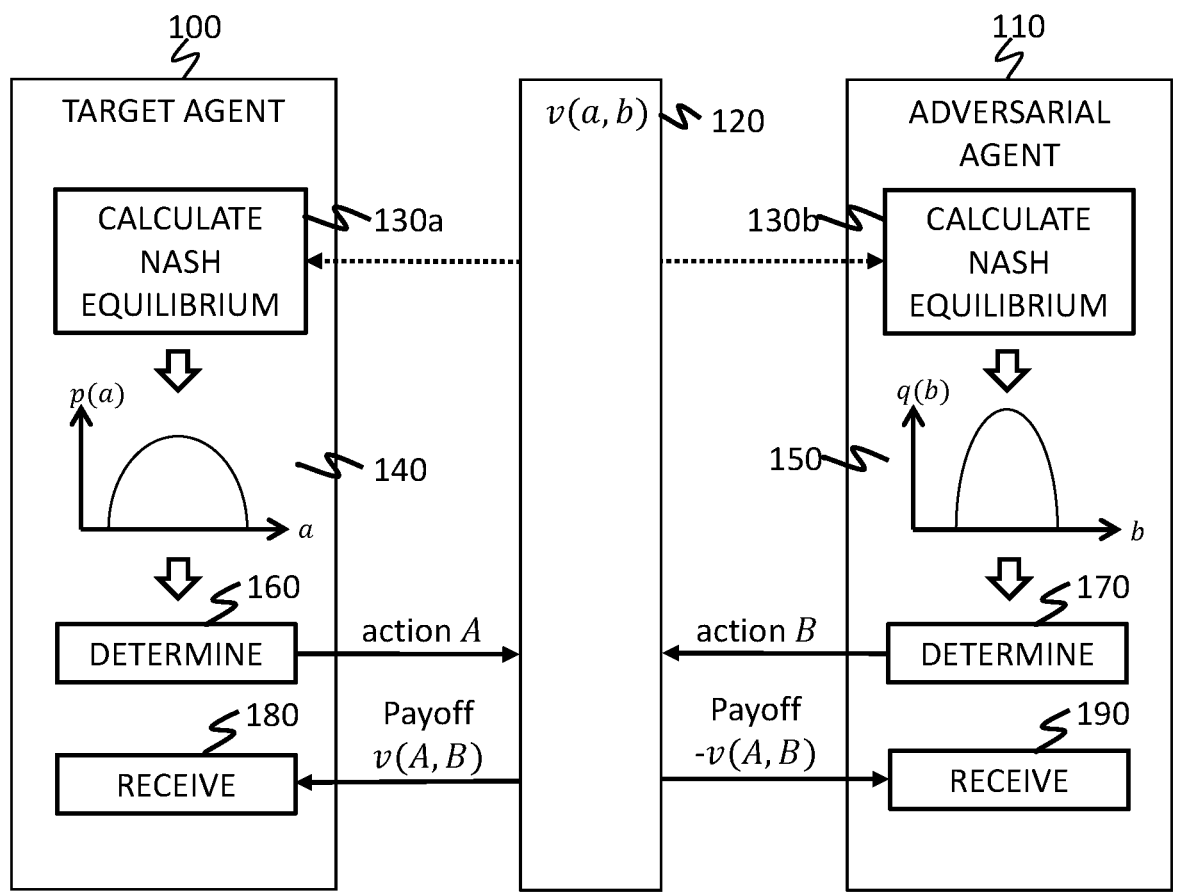
FIG. 1 shows a diagram of a strategic decision making process based on the Nash equilibrium, in accordance with an embodiment of the present invention.

FIG. 1 shows an exemplary diagram of strategic decision making based on the Nash equilibrium. In the situation of FIG. 1, a target agent 100 takes an action A and an adversarial agent 110 takes an adversarial action B (action B in this figure) without knowing the action of the opponent when determining their actions. The target agent 100 and the adversarial agent 110 receive their payoff as a result of taking actions from both sides. For example, each agent is a company who decides the amount of investment to each product or service to maximize the expected profit. Then, if the amount of investment to a particular product or service is smaller than that of another company, the company may lose some payoff relating to such product or service.

The strategic decision making in this application can be used to determine a strategy and actions of a target agent, such as the target agent 100, in variety of technical, industrial, and economic fields, such as autonomous vehicle driving, manufacturing, controlling robots, resource allocation between factories, investments, financial trading, and games.

A value function 120 is a function for calculating a payoff to the target agent 100 from the action a and the adversarial action b. Because the target agent 100 and the adversarial agent 110 are adversarial, the payoff to the target agent 100 increases as a payoff to the adversarial agent 110 decreases, and vice versa. Since FIG. 1 is an example of a zero-sum game, the target agent 100 receives payoff v(A, B) and then the adversarial agent 110 receives payoff −v(A, B) meaning that the adversarial agent 110 loses v(A, B) when the target agent 100 takes action A and the adversarial agent 110 takes action B.

The target agent 100 and the adversarial agent 110 seek to find an optimal strategy that can maximize their expected payoffs. The Nash equilibrium is a combination of strategies of all agents under the condition that every agent selects an optimal strategy and each agent loses some payoff if the agent changes its strategy. Under this situation, there is no motivation for each agent to change their strategy.

Although the target agent 100 does not know the strategy of the adversarial agent 110, the target agent 100 knows the value function 120. Therefore, the target agent 100 can calculate the Nash equilibrium (130a in FIG. 1) to obtain the combination of an optimal strategy p (140) of the target agent 100 and an optimal strategy q (150) of the adversarial agent 110. The adversarial agent 110 can also calculate the Nash equilibrium (130b) to obtain the combination of optimal strategies 140 and 150. In more detail, the target agent 100 and the adversarial agent 110 can solve the following formula to find the optimal strategy p (140) and the optimal strategy q (150).

$$\arg\max_p \min_q \sum_{a,b} v(a,b) p(a) q(b) = \arg\max_p \min_q E^{p,q} v(a,b) \quad (1)$$

Here, the strategy p can be represented as a probability distribution of available actions a of the target agent 100. The strategy q can be represented as a probability distribution of available actions b of the adversarial agent 110. In formula (1), the expected payoff can be calculated by summing v(a, b) for every combination of a and b weighted by the probability of taking actions a and b (i.e., p(a)q(b)). In other words, the expected payoff of the target agent 100 can be represented as an expectation of the payoff v(a, b) under the probability distributions p(a) and q(b). The strategy p determined from formula (1) maximizes the payoff of the target agent 100 while the strategy q determined from formula (1) minimizes the payoff of the target agent 100.

The target agent 100 determines (160) an action A of the target agent 100 based on the strategy p. For example, the target agent 100 may sample an action A from the probability distribution p(a). If the adversarial agent 110 is also conscious of finding an optimal strategy for the adversarial agent 110, then the adversarial agent 110 may also solve formula (1) (130b) and determines (170) an adversarial action B of the adversarial agent 110 based on the strategy q (150) obtained by solving formula (1). As a result of taking these actions, the target agent 100 receives the payoff v(A, B) (180) and the adversarial agent 110 receives the payoff −v(A, B) (190).

However, finding the Nash equilibrium eventually becomes computationally intractable as the action space increases. For example, the action can be for allocating resources to multiple targets (e.g., assigning an amount of investment to each of a plurality of products). In another example, the action can be an action of a team that is represented as a combination of actions of team members.

Figure 2:
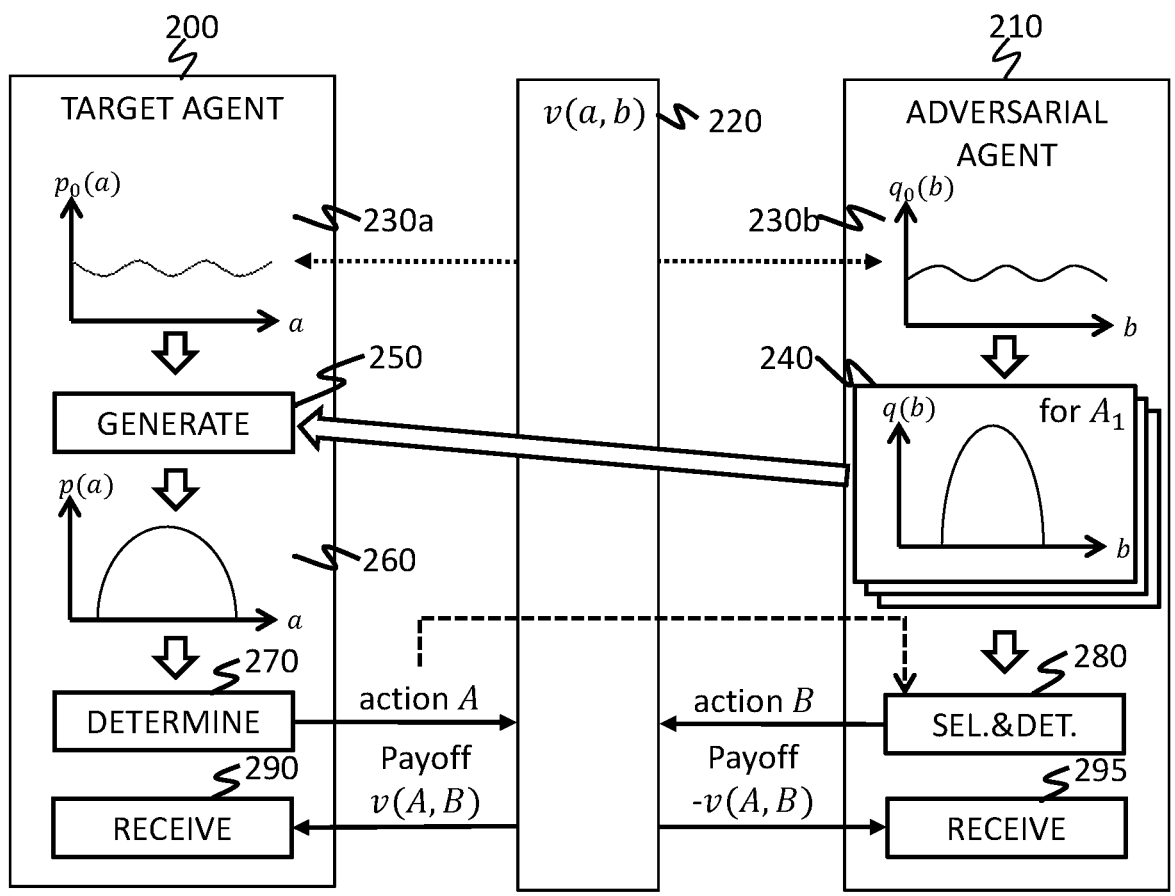
FIG. 2 shows a diagram of a strategic decision making process according to an embodiment of the present invention.

FIG. 2 shows a diagram of a strategic decision making according to an embodiment of the present invention. Similar to the situation of FIG. 1, a target agent 200 takes an action A and an adversarial agent 210 takes an adversarial action B (action B in FIG. 2) without knowing the action of the opponent when determining their actions. The target agent 200 and the adversarial agent 210 receive their payoff as a result of taking actions from both sides.

A value function 220 is a function for calculating a payoff to the target agent 200 based on the action a and the adversarial action b. The value function 220 may be substantially identical to the value function 120 in FIG. 1. Because the target agent 200 and the adversarial agent 210 are adversarial, the payoff to the target agent 200 increases as a payoff to the adversarial agent 210 decreases, and vice versa. Since FIG. 2 is also an example of a zero-sum game, the target agent 200 receives payoff v(A, B), and then the adversarial agent 210 receives payoff −v(A, B) meaning that the adversarial agent 210 loses v(A, B). Hereinafter, a strategic decision making for the target agent 200 to determine an appropriate action A using less computational resources is explained.

Since calculating the Nash equilibrium is computationally expensive, this approach adopts the following assumptions: First, instead of calculating the Nash equilibrium to find the adversarial strategy 150 of the adversarial agent 110, it is assumed that the adversarial agent 210 can know the action A that will be taken by the target agent 200 before the adversarial agent 210 determines the action B. The adversarial agent 210 can select the best adversarial strategy that can maximize payoff depending on the action A that will be taken by the target agent 200. This assumption is advantageous for the adversarial agent 210, but is pessimistic for the target agent 200.

Second, to reduce or counteract the above advantage, the adversarial agent 210 is assumed to generate the adversarial strategy q based on an adversarial base strategy $q_0$. Therefore, the adversarial strategy q of the adversarial agent 210 is allowed to depend on action A of the target agent 200, but it is constrained to be close to the adversarial base strategy $q_0$.

Third, to make action A of the target agent 200 less predictable to the adversarial agent 210, the target agent 200 determines action A by using a target base strategy $p_0$ of the target agent 200 as well as maximizing the payoff of selecting action A under the condition that the adversarial agent 210 determines adversarial action B with the knowledge that action A will be taken. For this purpose, the target agent 200 generates the target strategy p that can be closer to the target base strategy $p_0$ as well as that which can increase or maximize the payoff.

In this embodiment, by adopting these assumptions, formula (1) can be approximated as the following formula (2).

$$\arg\max_{p}\left\{E^p\left[\min_{q}\left\{E^q[v(A, B) \mid A] + \frac{1}{\gamma}LK(q\|q_0)\right\}\right] - \frac{1}{\alpha}KL(p\|p_0)\right\} \quad (2)$$

Here, KL denotes the Kullback-Leibler (KL) divergence that represents the difference between two distributions, and γ and α are parameters that are larger than zero. The parameters γ and α may be tuned by a user as an example. $p_0$ is a probability distribution of a target base strategy 230a, which is a base strategy of the target agent 200. $q_0$ is a probability distribution of an adversarial base strategy 230b, which is a base strategy of the adversarial agent 210.

By generating the target strategy p that satisfies formula (2), the target agent 200 can generate the target strategy p that maximizes the payoff to the target agent 200 under the condition that the adversarial agent 210 determines the adversarial action B with the knowledge of an action A of the target agent, with a constraint that makes the target strategy and the adversarial strategy closer to the target base strategy $p_0$ and the adversarial base strategy $q_0$, respectively. This constraint is implemented in formula (2) by including the term $$-\frac{1}{\alpha}KL(p\|p_0)$$

in max p and including the term $$\frac{1}{\gamma}KL(q\|q_0)$$

in min q.

In FIG. 2, the approach assumes that the adversarial agent 210 can calculate, for each candidate action of the target agent 200, the best adversarial strategy 240 that can decrease the expected payoff of the target agent 200 under the condition that the candidate action is known (i.e., $E^q$ [v(A, B)|A]) and can decrease the divergence from the adversarial base strategy 230b $$\left(\text{i.e., } \frac{1}{\gamma}KL(q\|q_0)\right)$$

as well. The target agent 200 can also calculate the adversarial strategies 240 for each action $A_1$, $A_2$, . . . if the target agent 200 can obtain a predetermined adversarial base strategy 230b. The target agent 200 generates (250 in FIG. 2) the target strategy 260 that can increase the expected payoff of the target agent 200 and can increase the divergence between the target strategy 260 and the target base strategy 230a to make action A less predictable. Based on the target strategy 260, the target agent 200 determines (270) its action A.

With the foregoing assumptions, the target agent 200 assumes that the adversarial agent 210 may select the best adversarial strategy against action A and determines action B based on the knowledge of action A (280). However, it is not necessary for the adversarial agent 210 to actually take the assumed adversarial action B. As a result of taking these actions, the target agent 200 receives the payoff v(A, B) (290) and the adversarial agent 210 receives the payoff −v(A, B) (295).

The target strategy p that maximizes formula (2), also referred to as p*, can be analytically solved from formula (2). The following formula (3) shows the solution of the target strategy p*.

$$p^*(a) \sim p_0(a)\exp\left(-\frac{\alpha}{\gamma}\log E^{q_0}[\exp(-\gamma\, v(a, B))]\right) \quad (3)$$

The formula (3) can be derived from formula (2) by using a representation of an expected risk measure (ERM) shown in the following formula (4).

$$ERM_\theta^{q_0}[X] = \frac{1}{\theta}\log E^q\left[e^{-\theta X}\right] = \max_q\left\{E^q - [-X] - \frac{1}{\theta}KL(q\|q_0)\right\} \quad (4)$$

The formula in argmax { } of formula (2) can be rewritten to the following formula (5) by applying formula (4).

$$E^p\left[\min_q\left\{E^q[v(A, B)\mid A] + \frac{1}{\gamma}KL(q\|q_0)\right\}\right] - \frac{1}{\alpha}KL(p\|p_0) = \quad (5)$$

$$E^p\left[ERM_\gamma^{q_0}[v(A, B)\mid A]\right] - \frac{1}{\alpha}KL(p\|p_0)$$

The target strategy p can be solved by calculating p that maximizes formula (5). The solution of the target strategy p is formula (3).

$$-\frac{1}{\gamma}\log E^{q_0}[\exp(-\gamma v(a, B))]$$

in formula (3) is a risk measure of action a, and is also referred to as $RM^{q_0}(a)$ in this application. The risk measure of action a, also referred to as $RM^{q_0}(a)$, is based on the adversarial base strategy $q_0$. $RM^{q_0}(a)$ is also based on a payoff to the target agent 200, namely, v(a, B), in a case where the target agent 200 takes action a and the adversarial agent 210 takes an adversarial action B based on the adversarial base strategy $q_0$. $RM^{q_0}(a)$ increases as the payoff v(a, B) increases and decreases as the payoff v(a, B) decreases. In formula (3), the risk measure increases as the expectation of exp(−γv(a, B)) under the condition that the adversarial action B is selected based on the adversarial base strategy $q_0$ decreases.

The probability of selecting action a based on the target strategy p*, namely, p*(a), is based on the probability of selecting action a based on the target base strategy $p_0$, namely, $p_0(a)$, and adjusted using $RM^{q_0}(a)$. p*(a) is increased from $p_0(a)$ as $RM^{q_0}(a)$ increases, and decreased from $p_0(a)$ as $RM^{q_0}(a)$ decreases. In formula (3), p*(a) is proportional to $p_0(a)$ multiplied by exponential of $\alpha RM^{q_0}(a)$. The sum of p*(a) for all action a may be normalized to 1.

Although the analytical solution of formula (2) is the target strategy p*(a) calculated by using formula (3), a different target strategy p based on the adversarial base strategy $q_0$ and a different risk measure can also be used. In this case, the target strategy p(a) may be an approximate solution of formula (3). For example, the following formula (6) can be used where the risk measure $$E^{q_0}[v(a, B)] + \frac{\gamma}{2}\mathrm{Var}^{q_0}[v(a, B)],$$

which is proportional to the weighted sum of the expectation of the payoff v(a, B) of action a and its variance, under the condition that the adversarial action B is selected based on the adversarial base strategy $q_0$.

$$p(a) \sim p_0(a)\exp\left(\alpha\left(E^{q_0}[v(a, B)] + \frac{\gamma}{2}\mathrm{Var}^{q_0}[v(a, B)]\right)\right) \quad (6)$$

Unnormalized p*(a) in formula (3) can be calculated in time O(|B|) for each action a. Therefore, the target strategy p* can be calculated in O(|A||B|). Since solving the Nash equilibrium involves solving an LP problem having O(|A|) variables and O(|A|+|B|) constraints, the strategic decision making of this embodiment may dramatically reduce the amount of computation.

Figure 3:
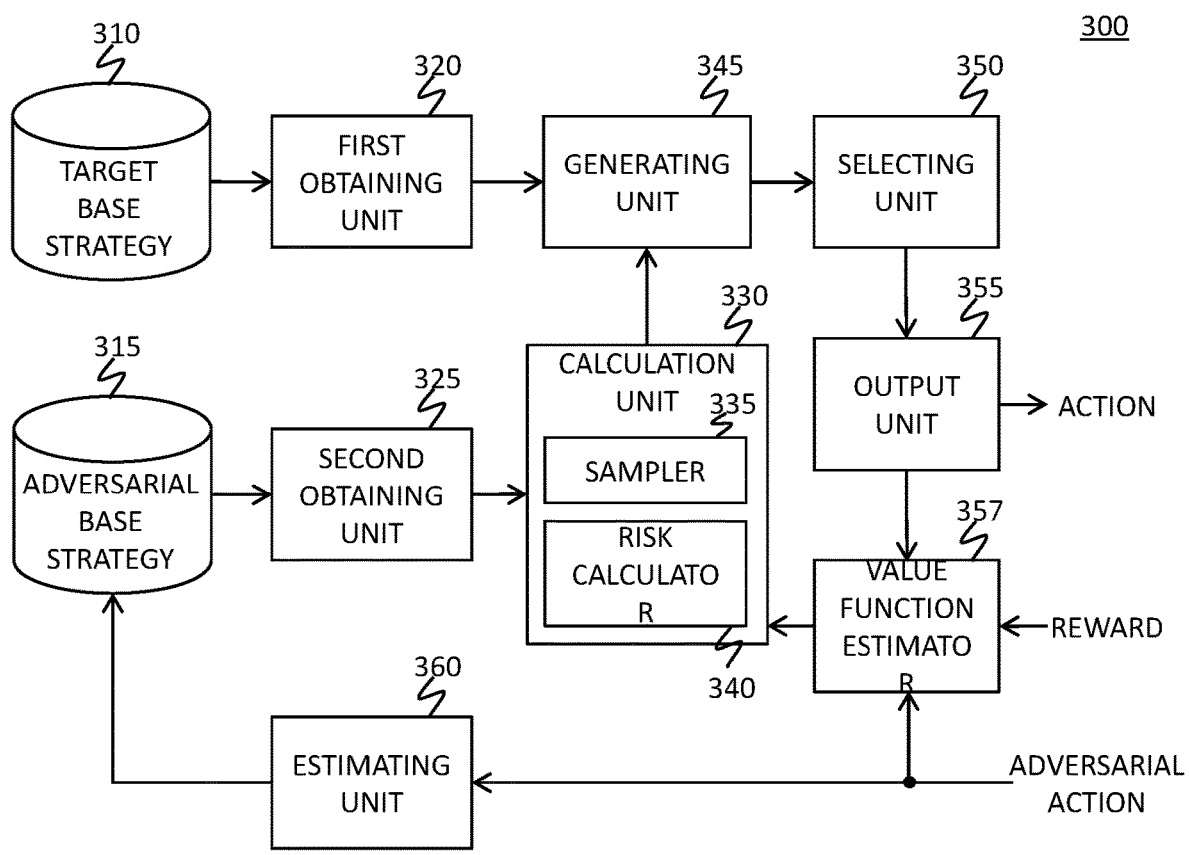
FIG. 3 shows a diagram of an apparatus according to an embodiment of the present invention.

FIG. 3 shows a diagram of an apparatus 300 according to an embodiment of the present invention. The apparatus 300 may be a detailed version of the target agent 200 in FIG. 2. While the apparatus 300 will be explained in reference to the target agent 200 in FIG. 1, the apparatus 300 can be implemented in another agent as well.

The apparatus 300 may also be a decision support apparatus that suggests a strategy and actions to an agent. The agent may be any kind of machine, a computer running a program, a person who takes actions based on the suggestion of the apparatus 300, or a player of a game. The apparatus 300 includes first storage 310, second storage 315, a first obtaining unit 320, a second obtaining unit 325, a calculation unit 330, a generating unit 345, a selecting unit 350, and an output unit 355.

The first storage 310 is storage such as registers, a memory, or a storage device that stores the target base strategy $p_0$ for selecting the actions of a target agent such as the target agent 200. The target base strategy $p_0$, such as the target base strategy 230a in FIG. 2, may be a probability distribution of taking each action a among a plurality of available actions of the target agent 200. For example, the probability distribution of the target base strategy $p_0$ can be a uniform distribution. The user or manufacturer of the apparatus 300 may set a uniform distribution as the target base strategy $p_0$. If the user or manufacturer of the apparatus 300 has some knowledge about the target strategy, then the first storage 310 may store a probability distribution that reflects the knowledge. To make actions of the target agent 200 further unpredictable to the adversarial agent 210, a random distribution may be mixed with the target base strategy $p_0$.

The second storage 315 is storage such as registers, a memory, or a storage device that stores the adversarial base strategy $q_0$ for selecting the adversarial actions of an adversarial agent such as the adversarial agent 210. The adversarial base strategy $q_0$ such as the adversarial base strategy 230b in FIG. 2 may be a probability distribution of taking each adversarial action among a plurality of available adversarial actions of the adversarial agent 210. For example, the probability distribution of the adversarial base strategy $q_0$ can be a uniform distribution. In most cases, the apparatus 300 or a user of the apparatus 300 does not know the adversarial base strategy $q_0$ and may store an appropriate probability distribution such as a uniform distribution in the second storage 315. If the user or manufacturer of the apparatus 300 has some knowledge about the adversarial strategy of the adversarial agent 210, then the second storage 315 may store a probability distribution that reflects the knowledge.

The first obtaining unit 320 is connected to the first storage 310. The first obtaining unit 320 obtains the target base strategy $p_0$ from the first storage 310. The second obtaining unit 325 is connected to the second storage 315. The second obtaining unit 325 obtains the adversarial base strategy $q_0$ from the second storage 315.

The calculation unit 330 is connected to the second obtaining unit 325. The calculation unit 330 calculates, for each candidate action a among a plurality of candidate actions of the target agent 200, the risk measure of the candidate action a based on the adversarial base strategy $q_0$ and a payoff v(a, B) of the target agent 200. In this embodiment, the calculation unit 330 calculates the risk measure $$RM^{q_0}(a) = -\frac{1}{\gamma}\log\ E^{q_0}[\exp(-\gamma\ v(a, B))]$$

shown in formula (3) for every action a available to the target agent 200. In another embodiment, the plurality of candidate actions may be a subset of all candidate actions available to the target agent 200.

The calculation unit 330 may include a sampler 335 and a risk calculator 340. The sampler 335 samples two or more adversarial actions B based on the adversarial base strategy $q_0$. According to the adversarial base strategy $q_0$, the probability of an adversarial action b is $q_0(b)$. The sampler 335 performs random sampling of each adversarial action B by selecting each adversarial action b with a probability $q_0(b)$.

The risk calculator 340 calculates the risk measure of the candidate action a based on the payoffs v(a, B) where the candidate action a and each of the sampled adversarial actions B are taken. In this embodiment, the distribution of the sampled adversarial actions B follows the probability distribution of $q_0$. If the sampled adversarial actions b are $B_0, B_1, B_2, \ldots$, then the risk calculator 340 calculates $\exp(-\gamma v(a, b))$ for each sampled adversarial action b to obtain $\exp(-\gamma v(a, B_0))$, $\exp(-\gamma v(a, B_1))$, $\exp(-\gamma v(a, B_2))$, ... and then calculates the average of them to obtain an expectation $E^{q_0}[\exp(-\gamma v(a, B))]$. The risk calculator 340 calculates a log of the expectation and multiplies a coefficient, such as $$-\frac{1}{\gamma},$$

by the log to obtain $RM^{q_0}(a)$.

The generating unit 345 is connected to the first obtaining unit 320 and the calculation unit 330. The generating unit 345 generates the target strategy p by adjusting the target base strategy $p_0$ based on the risk measure $RM^{q_0}(a)$ for each candidate action a. In this embodiment, the generating unit 345 calculates $p^*(a)$ by multiplying $p_0(a)$ by an exponential of $RM^{q_0}(a)$, and normalizes $p^*(a)$ to generate $p^*(a)$ represented in formula (3).

The selecting unit 350 is connected to the generating unit 345. The selecting unit 350 selects an action A of the target agent 200 based on the target strategy p* generated by the generating unit 345. The selecting unit 350 may perform a random sampling of an action A by selecting the action A among a plurality of actions a based on a probability p*(a) associated with each action a.

The output unit 355 is connected to the selecting unit 350. In an implementation in which the apparatus 300 is a decision support apparatus, the output unit 355 outputs the selected action A to the target agent 200 to cause the target agent 200 to take the selected action A. In an implementation in which the apparatus 300 is included in the target agent 200, the output unit 355 causes the target agent 200 or the apparatus 300 itself to take the selected action A by outputting the selected action A to the environment or the adversarial agent 210.

The apparatus 300 may further include a value function estimator 357. The value function calculator 357 receives the selected action A, the adversarial action B, and the payoff or a reward to the adversarial agent 210 as a result of the adversarial agent 210 taking the selected action A. In the situation in which the target agent 200 does not know a value function for calculating the payoff v(a,b) or the reward, the value function calculator 357 estimates the value function by using the selected action A, the adversarial action B, and the payoff or a reward to the adversarial agent 210.

The apparatus 300 may further include an estimating unit 360. The estimating unit 360 receives adversarial actions previously taken by the adversarial agent 210. The estimating unit 360 may receive historical data of adversarial actions. The estimating unit 360 estimates the adversarial base strategy $q_0(b)$ based on adversarial actions previously taken by the adversarial agent 210. For example, the estimating unit 360 may count, for each adversarial action b, the number of times the adversarial action b is performed by the adversarial agent 210. Then, the estimating unit 360 may generate the probability distribution of adversarial actions that can be used as the adversarial base strategy $q_0$.

In this embodiment, the apparatus 300 can drastically reduce the amount of computation of generating the target strategy p* compared to the amount of computation required to generate the target strategy based on the Nash equilibrium. This means that the apparatus 300 may generate the target strategy p* much faster, even with the same amount of computational resources.

Figure 4:
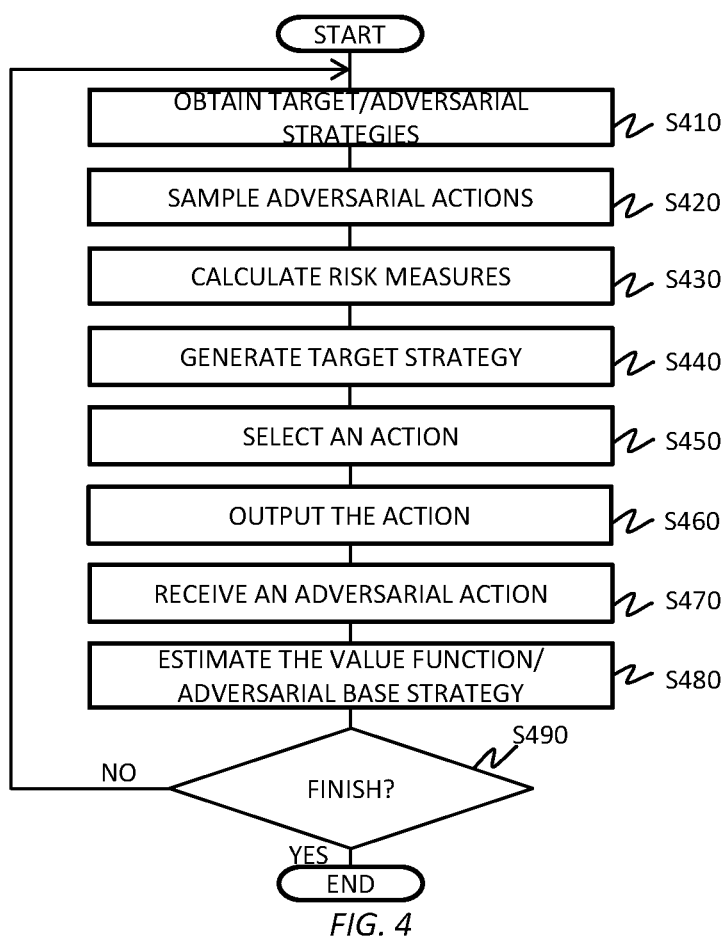
FIG. 4 shows an operational flow according to an embodiment of the present invention.

FIG. 4 shows an operational flow according to an embodiment of the present invention. The operations of FIG. 4 can be performed by, for example, the apparatus 300 and its components that were explained in reference to FIG. 3. The operations of FIG. 4 can also be performed by an apparatus including other components. While the operational flow of FIG. 4 will be explained in reference to the apparatus 300 and its components, the operational flow can be performed by other apparatuses having different components as well.

At S410 (Step 410), the first obtaining unit 320 obtains the target base strategy p from the first storage 310 by, for example, accessing and reading data including the target base strategy $p_0$ stored in the first storage 310. In another embodiment, the first obtaining unit 320 may receive the target base strategy $p_0$ from another apparatus or a user of the apparatus 300. The second obtaining unit 325 obtains the adversarial base strategy $q_0$ from the second storage 315 in a way similar to the way that the first obtaining unit 320 obtains the target base strategy $p_0$.

At S420, the sampler 335 samples two or more adversarial actions B based on the adversarial base strategy $q_0$. The sampler 335 may repeatedly sample a predetermined number of adversarial actions B according to the adversarial base strategy $q_0$. The accuracy of the risk measure $RM^{q_0}(a)$ can be increased as the sampling of adversarial actions B increases. However, the computation required for calculating the risk measure $RM^{q_0}(a)$ proportionally increases as the sampling of adversarial actions B increases. It is possible for the user or the manufacturer of the apparatus 300 to adjust the amount of sampling of adversarial actions B in consideration of the balance of accuracy and computational workload.

At S430, the risk calculator 340 calculates, for each candidate action a among a plurality of candidate actions a, the risk measure $RM^{q_0}(a)$ based on the payoffs v(a, B). At S440, the generating unit 345 generates the target strategy p* by adjusting the target base strategy $p_0$ based on the risk measure $RM^{q_0}(a)$ for each candidate action a.

At S450, the selecting unit 350 selects an action A of the target agent 200 based on the target strategy p* generated by the generating unit 345. At S460, the output unit 355 outputs the selected action A to cause the target agent 200 to take the selected action A. At S470, the estimating unit 360 receives the adversarial actions previously taken by the adversarial agent 210. In this embodiment, the estimating unit 360 receives an adversarial action each time the adversarial agent 210 takes the adversarial action.

At S480, the value function calculator 357 may estimate the value function for calculating the payoff v(a,b) based on the selected action A, the adversarial action B, and the payoff or a reward to the adversarial agent 210 as a result of the target agent 200 taking the selected action A. In an embodiment in which the payoff v(a,b) is constant for every pair of actions a and adversarial actions b, the value function calculator 357 records the payoff v(a,b) every time an action a and an adversarial action b are taken. In another embodiment, the value function calculator 357 trains a value function that estimates the payoff or a (cumulative) reward based on the pair of the selected action A, the adversarial action B, and the payoff or a reward to the adversarial agent 210 received in the current iteration of S410 to S480.

The estimating unit 360 may also estimate the adversarial base strategy $q_0(b)$ based on the received adversarial actions. The estimating unit 360 may estimate and update the adversarial base strategy $q_0(b)$ each time the estimating unit 360 receives an adversarial action. In another embodiment, the estimating unit 360 may estimate and update the adversarial base strategy $q_0(b)$ after receiving a predetermined number of adversarial actions.

At S490, the apparatus 300 checks whether the target agent 200 finishes taking actions. If the target agent 200 will take another action, then the apparatus 300 proceeds to perform S410. If the target agent 200 finishes taking actions, then the apparatus 300 finishes the workflow.

FIGS. 5A to 5B shows an algorithm according to an embodiment of the present invention. The algorithm of FIG. 5A to 5B can be performed by, for example, the apparatus 300 and its components that were explained in reference to FIG. 3. The algorithm of FIG. 5A to 5B can also be performed by an apparatus including other components. While the algorithm of FIG. 5A to 5B will be explained in reference to the apparatus 300 and its components, the algorithm can be performed by other apparatuses having different components as well.

In this embodiment, an apparatus, such as the apparatus 300, is applied to reinforcement learning (RL). In reinforcement learning, the target agent such as the target agent 200 and the adversarial agent such as the adversarial agent 210 take actions at each time step between the start time and the end time. The reward of the target agent 200 at each time step depends on the state at the time step as well as the actions of the target agent 200 and the adversarial agent 210 at the time step. In this embodiment, a reward to the target agent 200 at each time step increases as the reward to the adversarial agent 210 at each time step decreases, and vice versa. Therefore, the objective of the target agent 200 is to maximize the expected cumulative reward of the target agent 200, and the objective of the adversarial agent 210 is to minimize the expected cumulative reward of the target agent 200.

In reinforcement learning, a value function $V(s_t)$ that estimates the value of current state $s_t$ is updated and used to determine the next action that maximizes the value. The value function $V(s_t)$ is updated by using the following formula (5).

$$V(s_t) \leftarrow r_{s_t,a_t,b_t} + \rho V(s_{t+1}) \quad (5)$$

Here, $r_{s_t,a_t,b_t}$ is a reward obtained by taking an action $a_t$ and an adversarial action $b_t$ at the current state $s_t$ at time t. $\rho$ is a discount factor. This value function represents that the value of the current state $s_t$ is a sum of the reward at the current time t and the value of the next state $s_{t+1}$ discounted by the discount factor $\rho$.

In this embodiment, formula (5) is modified to produce formula (6) by adopting the assumptions that are used to approximate formula (1) as formula (2). Formula (6) is used at line 23 in FIG. 5B.

$$V(s_t) \leftarrow r_{s_t,a_t,b_t} - \frac{1}{\alpha}KL(p^*\|p_0) + \frac{1}{\gamma}KL(q^*\|q_0) + \rho V(s_{t+1}) \quad (6)$$

In this embodiment, the apparatus 300 uses an expected cumulative reward $r_{s_t,a,b} + \rho V(s_{t+1})$ of selecting the candidate action as the payoff at line 9 in FIG. 5A. In other words, as the payoff v(A, B) at each time step, the expected cumulative reward of taking action A and B at the time step is used.

Initial state $s_0$, a forward model F, the target base strategy $p_0$, and the adversarial base strategy $q_0$ are provided. Here, the forward model F(s, a, b) is a model that expects the next state of the current state s if an action a and an adversarial action b are taken. The forward model F(s, a, b) may be prepared by a user or a manufacturer of the apparatus 300 based on the decision making environment in the real world.

At line 1 of FIG. 5A, the apparatus 300 initializes time t to 0. The apparatus 300 initializes training data D to empty. A value network V that estimates an expected value of a state is initialized by, for example, assigning random weights and biases to a neural network that is to be used as the value network V. Alternatively, the apparatus 300 may obtain initial training data and an initial value network from another apparatus or external storage.

The apparatus 300 repeats the iteration of lines 2 to 29 for each time step by incrementing t for each time until a stopping condition is met. For example, the apparatus 300 may finish repeating if time t exceeds the maximum time or if the state reaches a terminal state.

Lines 3 to 13 show operations of the target agent 200 for choosing an action $a_t$ of the target agent 200 ("player 1" in FIG. 5A). The apparatus 300 calculates a risk measure for each candidate action a among a plurality of available actions in action set represented as A in FIG. 5A to 5B.

At line 4, the sampler 335 samples M adversarial actions $b^{(m)}$ (m=1, 2, . . . , M) according to the adversarial base strategy $q_0$. Lines 5 to 8 show operations of the target agent 200 for calculating expected future value $v^{(m)}$ of the target agent 200 for each m under the condition that the action a and the adversarial action $b^{(m)}$ are taken at the current state $s_t$.

At line 6, the risk calculator 340 simulates the environment to obtain a next state after the current state $s_t$. In this embodiment, the transition to the next state is non-deterministic. Therefore, the risk calculator 340 simulates the forward model F ($s_t$, a, $b^{(m)}$) N times (N>1) and obtain N expected next states s(n) (n=1, 2, . . . , N). At line 7, the risk calculator 340 calculates an average of the expected value $\tilde{V}(s^{(m)})$ of each expected next state $s^{(m)}$ to obtain, for each m, an expected future value $v^{(m)}$ of the next state under the condition that the action a and the adversarial action $b^{(m)}$ are taken.

At line 9, the risk calculator 340 calculates an action value $\tilde{Q}(s_t, a)$ of selecting the candidate action a at the current state $s_t$. The risk calculator 340 calculates an expected cumulative reward $r_{s_t,a,b^{(m)}}+\rho v^{(m)}$ of selecting the candidate action a, which is a sum of the current reward of taking the candidate action a under the condition that the adversarial action $b^{(m)}$ is taken and the future value $v^{(m)}$ is discounted by a discount factor ρ (0≤ρ≤1). The risk calculator 340 calculates the risk measure $RM^{q_0}(a)$ by using the expected cumulative reward $r_{s_t,a,b^{(m)}}+\rho v^{(m)}$ as the payoff. In this embodiment, the risk measure $RM^{q_0}(a)$ is used as the action-value function $\tilde{Q}(s_t, a)$ or the Q function of reinforcement learning.

At line 11, the generating unit 345 generates the target strategy p*(a|$s_t$) at the current state $s_t$, which is a distribution of the probability of taking each candidate action a, by adjusting the target base strategy $p_0$(a|$s_t$) at the current state $s_t$ based on the action-value function $\tilde{Q}(s_t, a)$. Here, Z is a parameter for normalizing p*(a|$s_t$).

At line 12, the selecting unit 350 selects an action $a_t$ of the target agent 200 according to the target strategy p*(•|$s_t$). In this embodiment, the selecting unit 350 samples the action $a_t$ according to the probability distribution p*(•|$s_t$). At line 13, the apparatus 300 calculates a KL divergence KL(p*(•|$s_t$)||$p_0$(•|$s_t$)) that corresponds to KL(p||$p_0$) in the formula (2).

Lines 14 to 21 in FIG. 5B show operations of the adversarial agent 210 for choosing an adversarial action of the adversarial agent 210 ("player 2" in FIG. 5B). The value function calculator 357 of the apparatus 300 may perform operations of the adversarial agent 210 (lines 14 to 21) in the calculation unit 330 to estimate the adversarial strategy q* for the purpose of training the value network V that is used as a value function. In the example of FIG. 5B, it is assumed that the adversarial agent 210 can know the action $a_t$ of the target agent 200 before determining the adversarial action $b_t$ of the adversarial agent 210. In another embodiment, the adversarial agent 210 may determine the adversarial action $b_t$ without knowing the action $a_t$.

Lines 14 to 18 show operations for calculating the action value $\tilde{Q}(s_t, a_t, b)$ at the current state $s_t$ for each adversarial action b. At line 15, the value function calculator 357 simulates the environment to obtain a next state after the current state $s_t$ under the condition that the action $a_t$ will be taken. Similar to line 6, the value function calculator 357 simulates the forward model F($s_t$, $a_t$, b) N times and obtains N expected next states $s^{(n)}$ (n=1, 2, . . . , N). At line 16, the value function calculator 357 calculates an average of the expected value $\tilde{V}(s^{(n)})$ of each expected next state $s^{(n)}$ to obtain an expected future value v of the next state under the condition that the action $a_t$ and the adversarial action b are taken.

At line 17, the value function calculator 357 calculates an action-value $\tilde{Q}(s_t, a_t, b)$ of selecting the adversarial action b at the current state $s_t$. In this example, the value function calculator 357 calculates an expected cumulative reward $r_{s_t,a_t,b}+\rho v$ of selecting the adversarial action b, which is a sum of the current reward of taking the adversarial action b under the condition that the action $a_t$ is taken and the future value v discounted by a discount factor ρ (0≤ρ≤1). The expected cumulative reward $r_{s_t,a_t,b}+\rho v$ is used as the action-value function $\tilde{Q}(s_t, a)$ or the Q function of reinforcement learning.

At line 19, the value function calculator 357 generates the adversarial strategy q*(b|$s_t$, $a_t$) at the current state $s_t$, which is a probability distribution of taking each adversarial action b, by adjusting the adversarial base strategy $q_0$(b|$s_t$, $a_t$) at the current state $s_t$ based on the action-value function $\tilde{Q}(s_t, a_t, b)$. Here, Z is a parameter for normalizing q*(b|$s_t$, $a_t$).

At line 20, the value function calculator 357 selects an adversarial action $b_t$ according to the adversarial strategy q*($s_t$, $a_t$). In this embodiment, the value function calculator 357 samples the adversarial action $b_t$ according to the probability distribution q*($s_t$, $a_t$). In another embodiment, the value function calculator 357 receives the real adversarial action $b_t$ taken by the adversarial agent 210 outside of the apparatus 300. At line 21, the value function calculator 357 calculates a KL divergence KL(q*(•|$s_t$, $a_t$)||$q_0$(•|$s_t$, $a_t$)) that corresponds to KL(q||$q_0$) in the formula (2).

Lines 22 to 26 show operations for training the value network $\tilde{V}$. At line 22, the value function calculator 357 performs a transition from the current state $s_t$ to the next state $s_{t+1}$ by applying the current state $s_t$, the action $a_t$ at the current time t, and the adversarial action $b_t$ at the current time t to the forward model F to generate the next state $s_{t+1}$ from F ($s_t$, $a_t$, $b_t$). In an embodiment in which the apparatus 300 can observe the state from the environment, the value function calculator 357 may observe, instead of using the forward model F ($s_t$, $a_t$, $b_t$), the state $s_{t+1}$ after the action $a_t$ and the adversarial action $b_t$ are taken.

At line 23, the value function calculator 357 calculates the value at time t based on formula (6). The value $y_t$ at time t is based on the sum of the reward at the current time t and the value of the next state $s_{t+1}$ discounted by the discount factor ρ. In addition to this, the value $y_t$ increases as the difference between probability distributions of the target strategy p* and the target base strategy $p_0$ decreases. The value $y_t$ also increases as the difference between probability distributions of the adversarial strategy q* and the adversarial base strategy $q_0$ increases.

At line 24, the value function calculator 357 updates training data D with the pair of the current state $s_t$ and the value $y_t$. The value function calculator 357 may add or append the pair in training data D.

At lines 25 to 26, the value function calculator 357 retrains the value network $\tilde{V}$ by using training data D if the condition for retraining is met. For example, the value function calculator 357 may determine that the condition is met each time the iteration of lines 2 to 29 is repeated predetermined times. The value function calculator 357 may train the value network $\tilde{V}$ using backpropagation.

In this embodiment, the apparatus, such as the apparatus 300, can approximate the Nash equilibrium to determine the target strategy p* and an action $a_t$ for each time step in reinforcement learning. Therefore, the apparatus 300 can drastically reduce the amount of computation of generating the target strategy p* compared to the amount of computation required to generate the target strategy based on the Nash equilibrium. Since the apparatus 300 can reduce the computation of the Nash equilibrium in each time step, the apparatus 300 may be able to generate the target strategy p* much faster, even with the same computational resource.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Figure 6:
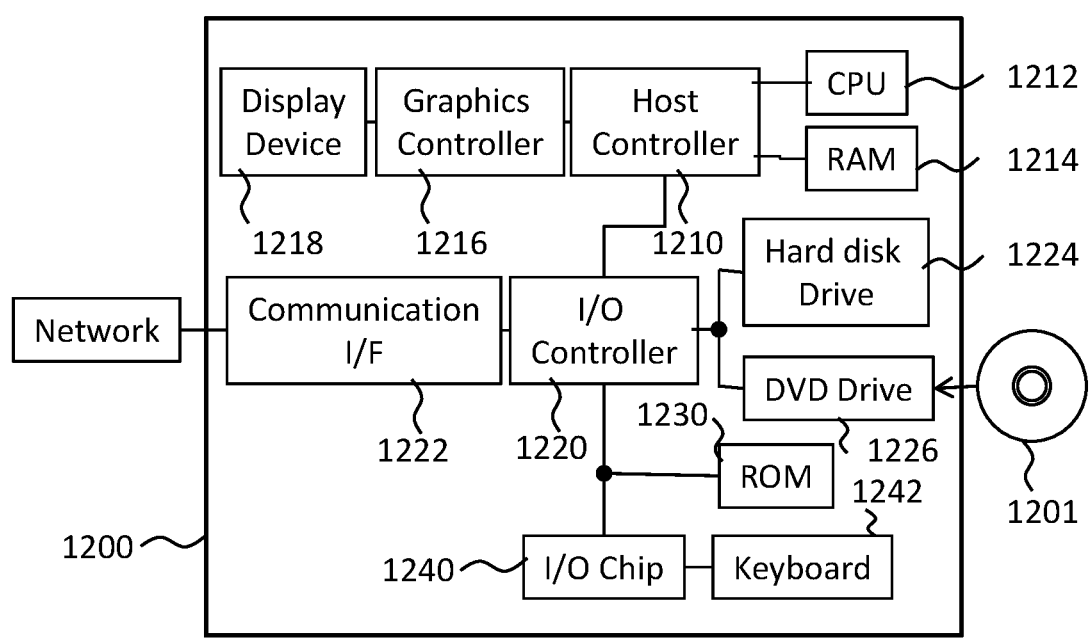
FIG. 6 shows a hardware configuration of a computer according to an embodiment of the present invention.

FIG. 6 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RANI 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
   obtaining, by one or more processors, a target base strategy for selecting actions for driving an autonomous vehicle;
   obtaining, by one or more processors, an adversarial base strategy for selecting adversarial actions of an adversarial agent;
   calculating, by one or more processors, for each candidate action among a plurality of candidate actions for driving the autonomous vehicle, a risk measure of the candidate action based on the adversarial base strategy and a payoff to the autonomous vehicle in a case where the autonomous vehicle takes the candidate action and the adversarial agent takes an adversarial action based on the adversarial base strategy;
   generating, by one or more processors, a target strategy by adjusting the target base strategy based on the risk measure for each candidate action;
   selecting, by one or more processors, an action to drive the autonomous vehicle based on the target strategy; and
   causing, by one or more processors, the autonomous vehicle to drive according to the selected action.

2. The computer-implemented method of claim 1, wherein the payoff to the autonomous vehicle increases as a payoff to the adversarial agent decreases.

3. The computer-implemented method of claim 1, wherein the adversarial base strategy is a probability distribution of taking each adversarial action among a plurality of adversarial actions.

4. The computer-implemented method of claim 3, wherein the probability distribution is a uniform distribution.

5. The computer-implemented method of claim 3, further comprising estimating, by one or more processors, the adversarial base strategy based on adversarial actions previously taken by the adversarial agent.

6. The computer-implemented method of claim 1, wherein the target base strategy is a probability distribution of taking each action among a plurality of actions of the autonomous vehicle.

7. The computer-implemented method of claim 6, wherein the probability distribution is a uniform distribution.

8. The computer-implemented method of claim 1, wherein calculating the risk measure comprises:
   sampling, by one or more processors, a plurality of adversarial actions based on the adversarial base strategy; and
   calculating, by one or more processors, the risk measure of the candidate action based on the payoffs wherein the candidate action and each of the plurality of adversarial actions are taken.

9. The computer-implemented method of claim 1, wherein the payoff is an expected cumulative reward of selecting the candidate action.

10. The computer-implemented method of claim 1, wherein the generating the target strategy comprises generating, by one or more processors, the target strategy that maximizes the payoff to the autonomous vehicle under the condition that the adversarial agent determines the adversarial action with the knowledge of an action of the autonomous vehicle, with a constraint that makes the target strategy and an adversarial strategy closer to the target base strategy and the adversarial base strategy, respectively.

11. A computer program product comprising:
   one or more computer readable storage media, and program instructions collectively stored on the one or more computer readable storage media, the program instructions comprising:
   program instructions to obtain a target base strategy for selecting actions for driving an autonomous vehicle;
   program instructions to obtain an adversarial base strategy for selecting adversarial actions of an adversarial agent;
   program instructions to calculate for each candidate action among a plurality of candidate actions for driving the autonomous vehicle, a risk measure of the candidate action based on the adversarial base strategy and a payoff to the autonomous vehicle in a case where the autonomous vehicle takes the candidate action and the adversarial agent takes an adversarial action based on the adversarial base strategy;
   program instructions to generate a target strategy by adjusting the target base strategy based on the risk measure for each candidate action;
   program instructions to select an action to drive the autonomous vehicle based on the target strategy; and
   program instructions to cause the autonomous vehicle to drive according to the selected action.

12. The computer program product of claim 11, wherein the payoff to the autonomous vehicle increases as a payoff to the adversarial agent decreases.

13. The computer program product of claim 11, wherein the adversarial base strategy is a probability distribution of taking each adversarial action among a plurality of adversarial actions.

14. The computer program product of claim 13, wherein the probability distribution is a uniform distribution.

15. The computer program product of claim 13, further comprising program instructions, collectively stored on the one or more computer readable storage media, to estimate the adversarial base strategy based on adversarial actions previously taken by the adversarial agent.

16. The computer program product of claim 11, wherein the target base strategy is a probability distribution of taking each action among a plurality of actions of the autonomous vehicle.

17. The computer program product of claim 16, wherein the probability distribution is a uniform distribution.

18. A computer system comprising:
one or more computer processors, one or more computer readable storage media, and program instructions collectively stored on the one or more computer readable storage media for execution by at least one of the one or more computer processors, the program instructions comprising:
program instructions to obtain a target base strategy for selecting actions for driving an autonomous vehicle;
program instructions to obtain an adversarial base strategy for selecting adversarial actions of an adversarial agent;
program instructions to calculate for each candidate action among a plurality of candidate actions for driving the autonomous vehicle, a risk measure of the candidate action based on the adversarial base strategy and a payoff to the autonomous vehicle in a case where the autonomous vehicle takes the candidate action and the adversarial agent takes an adversarial action based on the adversarial base strategy;
program instructions to generate a target strategy by adjusting the target base strategy based on the risk measure for each candidate action;
program instructions to select an action to drive the autonomous vehicle based on the target strategy; and
program instructions to cause the autonomous vehicle to drive according to the selected action.

* * * * *